United States Patent
Kim et al.

(10) Patent No.: US 9,880,425 B2
(45) Date of Patent: Jan. 30, 2018

(54) SMART WINDOW USING GLASS BEADS AND LIQUID CRYSTAL, AND PRODUCTION METHOD THEREFOR

(71) Applicants: HYUNDAI MOTOR COMPANY, Seoul (KR); KIA MOTORS CORPORATION, Seoul (KR); INDUSTRY ACADEMY COOPERATION FOUNDATION OF SEJONG UNIVERSITY, Seoul (KR)

(72) Inventors: Hyun Sub Kim, Seoul (KR); Yong Ho Seo, Seoul (KR)

(73) Assignees: HYUNDAI MOTOR COMPANY, Seoul (KR); KIA MOTORS CORPORATION, Seoul (KR); INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 60 days.

(21) Appl. No.: 14/930,544

(22) Filed: Nov. 2, 2015

(65) Prior Publication Data

US 2016/0161787 A1   Jun. 9, 2016

(30) Foreign Application Priority Data

Dec. 3, 2014   (KR) .................. 10-2014-0172481

(51) Int. Cl.
*G02F 1/1333*   (2006.01)
*G02F 1/1339*   (2006.01)
(Continued)

(52) U.S. Cl.
CPC ............ *G02F 1/13392* (2013.01); *B32B 7/12* (2013.01); *B32B 17/06* (2013.01); *B32B 27/36* (2013.01);
(Continued)

(58) Field of Classification Search
CPC ...... G02F 1/13; G02F 1/1339; G02F 1/13306; G02F 1/13439; G02F 1/1333; G02F 1/13392; G02F 1/13394; G02F 1/1343; G02F 1/1335; G02F 1/133504; G02F 2001/133302; G02F 2001/13756;
(Continued)

(56) References Cited

U.S. PATENT DOCUMENTS 8,003,197 B2   8/2011   Yukawa et al.
2002/0109816 A1*   8/2002   Freeman ............. G02F 1/13392
349/156

FOREIGN PATENT DOCUMENTS

JP   06-317801 A   11/1994
JP   2000-515648 A   11/2000
(Continued)

*Primary Examiner* — Thoi Duong
(74) *Attorney, Agent, or Firm* — McDermott Will & Emery LLP

(57) ABSTRACT

A smart window, and production method therefor, uses glass beads made from glass material instead of a polymer matrix of the conventional smart window. This makes the liquid crystal's size, shape and arrangement constant by placing the liquid crystal outside the glass beads, thereby securing high stability and chemical resistance, avoiding haze, having low operating voltage, and having improved optical, for example, broad variable range of light transmittance between OFF (light impermeable) and ON (light permeable) states.

5 Claims, 6 Drawing Sheets

(51) Int. Cl.
  *B32B 17/06* (2006.01)
  *B32B 27/36* (2006.01)
  *B32B 7/12* (2006.01)
  *G02F 1/13* (2006.01)
  *G02F 1/139* (2006.01)
  *B32B 37/12* (2006.01)
  *B32B 37/00* (2006.01)

(52) U.S. Cl.
  CPC ........ *B32B 37/1284* (2013.01); *G02F 1/1313* (2013.01); *G02F 1/1393* (2013.01); *B32B 37/0038* (2013.01); *B32B 2255/10* (2013.01); *B32B 2255/26* (2013.01); *B32B 2264/101* (2013.01); *B32B 2305/30* (2013.01); *B32B 2307/202* (2013.01); *B32B 2307/40* (2013.01); *B32B 2315/08* (2013.01); *B32B 2367/00* (2013.01); *B32B 2605/00* (2013.01); *B32B 2605/006* (2013.01); *G02F 2001/13398* (2013.01)

(58) Field of Classification Search
  CPC .......... G02F 2001/133311; G02F 2001/13398; G02F 2001/13415; G02F 2201/50; G02F 2202/28; G02F 2203/03; G03B 21/006; B32B 17/10504; B32B 2264/101; B32B 2305/30; B32B 2307/202; B32B 2315/08; B32B 2605/00; B32B 2605/006; B32B 37/1284; B32B 7/12; G09G 3/3681; G09G 3/3692; C09J 143/02
  USPC ....... 349/201, 202, 187, 189, 122, 196, 197, 349/153, 33, 155, 16, 127, 154, 193; 156/60
  See application file for complete search history.

(56) References Cited

FOREIGN PATENT DOCUMENTS

| | | |
|---|---|---|
| KR | 10-2003-0073121 A | 9/2003 |
| KR | 10-0591779 B1 | 6/2006 |
| KR | 10-2007-0044982 A | 5/2007 |
| KR | 10-2011-0030410 A | 3/2011 |
| KR | 10-1037769 B1 | 5/2011 |

* cited by examiner

SMART WINDOW USING GLASS BEADS AND LIQUID CRYSTAL, AND PRODUCTION METHOD THEREFOR

CROSS-REFERENCE TO RELATED APPLICATION

This application claims under 35 U.S.C. § 119(a) the benefit of Korean Patent Application No. 10-2014-0172481, filed Dec. 3, 2014, the entire contents of which are incorporated herein by reference.

BACKGROUND

(a) Technical Field

The present disclosure relates to a smart window using glass beads and liquid crystal, and a method of production thereof.

(b) Background Art

The automotive industry is one in which advanced technologies in machinery, electronics, chemistry, energy and environment fields are integrated, and which contributes greatly to development of industry in general, greatly affecting the market economy. Recently, high efficiency, safety and convenience have become important topics as concerns about exhaustion of resources, reinforcement of environment regulation, and protection of privacy and quality of life are increasing. Smart window technology, which can improve energy efficiency and satisfy both aesthetics and functionality, is drawing considerable attention.

The smart window is a part of an active control technology, which can reduce energy loss and provide a pleasant environment to customers by freely controlling transmittance of light introduced from the outside. This can be considered to be a basic technology, which can be commonly applied to various industrial fields such as transportation, information display, architecture and the like. Because this technology enables a simple operation by pressing button or the like to change between transparency and opacity of the smart window, and provide various advanced convenience functions, it is expected to be actively applied and developed for creating high added value to automobiles.

Previously, the smart window was manufactured using polymer dispersed liquid crystal (Hereinafter, "PDLC") technology. The PDLC has a structure where micron-sized liquid crystal particles are distributed in a polymer matrix, and controls light transmittance due to refractive index difference between the liquid crystal particles and the polymer upon application of an external voltage. As shown in FIG. 1A, in an on OFF state when voltage is not applied, the liquid crystal particles are irregularly arranged, and light is scattered due to refractive index difference with the polymer matrix. As shown in FIG. 1B, in an ON state when voltage is applied, the liquid crystal particles are regularly arranged to have the same refractive index with the polymer matrix, thereby transmitting light. Thus, the difference between light impermeability by scattering and transmittance by applying voltage is an important factor in determining the performance of a smart window.

The PDLC using a polymer matrix may impart haze to cause the smart window to have a turbid color, and the polymer is hardened and altered when it is exposed to UV. Accordingly, there is a problem in that yellowing tends to occur in the smart window.

Further, because most of an electric field applied to the transparent electrode adjacent to the polymer matrix is covered by induced polarization of the polymer due to a high dielectric constant of the polymer matrix, there is a disadvantage in that a high driving voltage is needed.

In addition, because the arrangement of liquid crystal particles in the polymer matrix is irregular when in an OFF state, transmittance range is narrow (the maximum light blocking rate is at a 65% level).

Moreover, in order to color the smart window, a dye should be added. However, because the dye is characterized by absorbing light, it reduces light transmittance in the OFF and ON states, and therefore, it is difficult to discern the desired color.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

Accordingly, objects of the present invention are to improve smart window characteristics, and provide a practical manufacturing method therefor.

The objects of the present invention are not limited to the above-described objects, and other objects and advantages of the present invention that have not been described will be understood by the following description, and become apparent with reference to the embodiments of the present invention. In addition, it will be appreciated that the objects and advantages of the present invention will be easily realized by means shown in the appended patent claims, and combinations thereof.

To achieve the above objects, the present invention includes the following constituents.

In one aspect, the present invention provides a smart window using glass beads and liquid crystal including: a pair of transparent electrodes, separately arranged to face each other with a small interval therebetween; glass beads interposed between the transparent electrodes; and liquid crystal, which surrounds the outside of the glass beads, and is interposed between the transparent electrodes.

In an embodiment, the transparent electrode may be glass or polyethylene terephthalate (PET) film coated with a transparent conductive thin film.

In another embodiment, the glass beads may have homogeneous diameter of 10 to 20 μm, and may be evenly dispersed between the transparent electrodes.

In still another embodiment, the glass beads may be interposed between the transparent electrodes as a single layer.

In another embodiment, the glass beads may be interposed between the transparent electrodes as a multiple layer.

In a further embodiment, the glass beads may have a staggered structure such that the glass beads of the upper layer are located at spaces between neighboring glass beads of the lower layer.

In another embodiment, the liquid crystal may be constantly arranged along the outside of the glass beads in an OFF state of the smart window.

In still another embodiment, the liquid crystal may be arranged parallel to an electric field generated by the transparent electrode in an ON state of the smart window, thereby transmitting light.

In yet another embodiment, the thickness of the smart window may be 4 to 50 μm.

Another aspect, the present invention provides a method for manufacturing a smart window using glass beads and liquid crystal including: (i) coating an adhesive on one side of the lower layer of transparent electrodes; (ii) evenly dispersing glass beads on the adhesive-coated side of the lower layer of transparent electrodes; (iii) adhering the glass beads to the lower layer of the transparent electrodes by hardening the adhesive; (iv) shaking out the residual glass beads except the single-layered glass beads adhered to the surface of the lower layer of the transparent electrodes from the lower layer of the transparent electrodes; (v) bonding the upper layer of the transparent electrodes to cause the glass beads to be interposed between a pair of the transparent electrodes; and (vi) injecting liquid crystal between a pair of the transparent electrodes to the glass beads to surround the outside of the glass beads.

In still another aspect, the present invention provides a method for manufacturing a smart window using glass beads and liquid crystal including: (i) coating an adhesive on each one side of the lower layer and the upper layer of transparent electrodes; (ii) evenly dispersing glass beads on the adhesive-coated sides of the lower layer and the upper layer of the transparent electrodes; (iii) adhering the glass beads to the lower layer and the upper layer of the transparent electrodes by hardening the adhesive; (iv) shaking out the residual glass beads except the single-layered glass beads adhered to the surface of the lower layer and the upper layer of the transparent electrodes from the lower layer and the upper layer of the transparent electrodes; (v) bonding the lower layer and the upper layer of the transparent electrodes to cause the glass beads to be interposed between a pair of the transparent electrodes; and (vi) injecting liquid crystal between a pair of the transparent electrodes to the outside of the glass beads to surround the glass beads.

In an embodiment, the liquid crystal may be injected between the transparent electrodes using capillary force.

In another embodiment, the glass beads may be a multiple layer manufactured to have staggered structure where the glass beads adhered to the upper layer of the transparent electrodes are located at spaces between neighboring glass beads adhered to the lower layer of the transparent electrodes.

Other aspects and embodiments of the invention are discussed hereinafter.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed hereinafter.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1A:
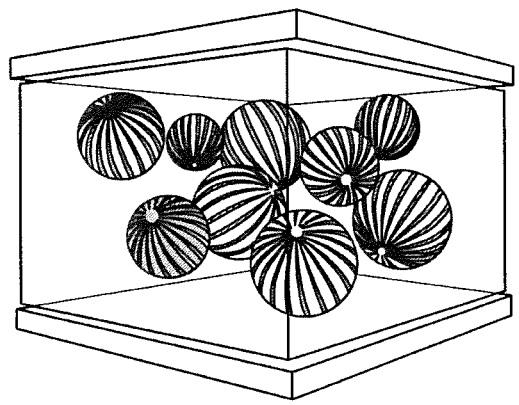
FIGS. 1A and 1B are a schematic diagram illustrating structures of conventional PDLCs.
Figure 1B:
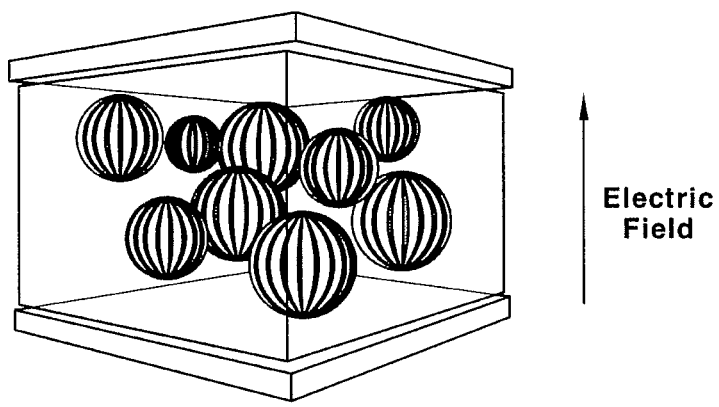

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2A:
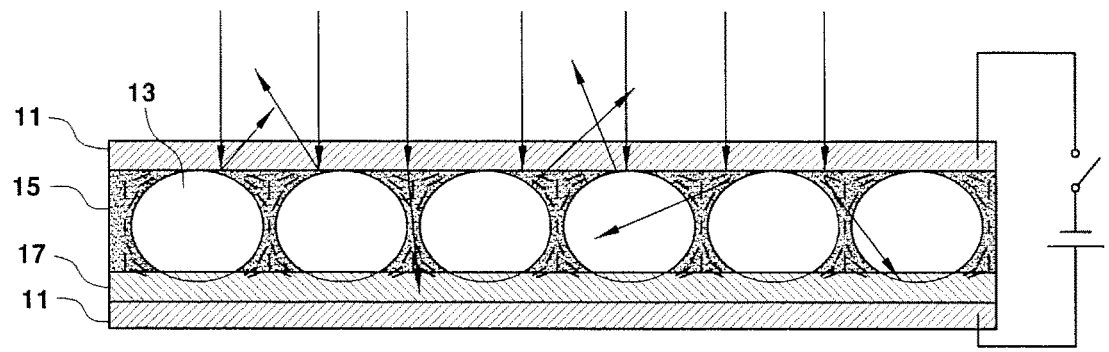
FIGS. 2A and 2B is a schematic diagram illustrating structures of the smart windows using glass beads and liquid crystal of the present invention.
Figure 2B:
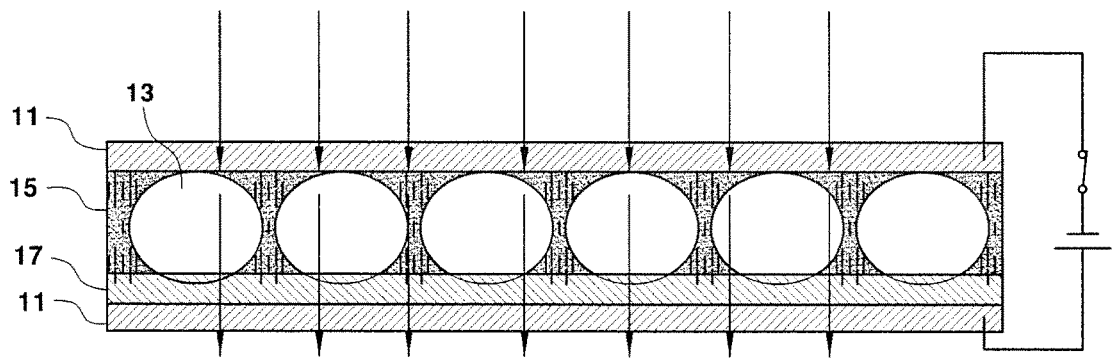

Referring to FIGS. 2A and 2B, the smart window using glass beads 13 and liquid crystal 15 according to embodiments of the present invention may include a pair of transparent electrodes 11, which are separately arranged to face each other with a small interval therebetween; glass beads 13, which are interposed between the transparent electrodes 11; an adhesive 17 fixing position of the glass beads 13; and liquid crystal 15, which surrounds the outside of the glass beads 13, and is interposed between the transparent electrodes 11.

The transparent electrode is glass or polyethylene terephthalate (PET) film coated with a transparent conductive thin film such as ITO, FTO and the like, and is connected to an external power supply of the smart window. Thus, when it is in an ON state, an electric field is generated at spaces between the transparent electrodes 11. Preferably, an ITO film may be used as the transparent electrode.

The glass beads 13 are a constituent interposed between a pair of transparent electrodes 11. The glass beads 13 may have the shape of a glass bead and homogeneous diameter of 10 to 20 μm, and may be evenly dispersed between the transparent electrodes 11.

The glass beads 13 are a constituent replacing a polymer matrix of PDLC, and have an advantage of having efficiency due to their high stability and chemical resistance because they are made from glass instead of polymer, no hazing on the smart window, and low driving voltage.

Figure 3:
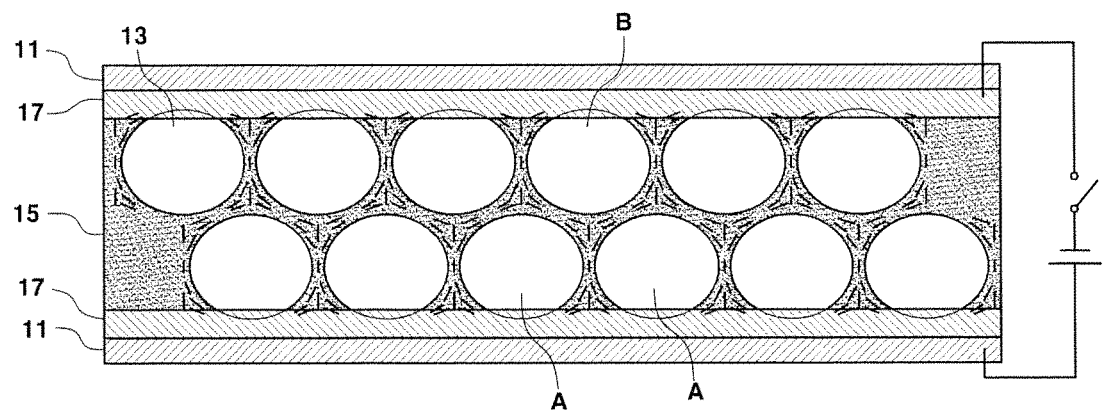
FIG. 3 is a schematic diagram illustrating structure of the smart window of an embodiment of the present invention, which contains glass beads having a multiple layered structure.

Referring to FIG. 3, the glass beads 13 may be formed as a multiple layered structure between the transparent electrodes 11, and may have a staggered structure where the glass beads (B) of the upper layer are located at spaces between neighboring glass beads (A) of the lower layer. Thus, operation of the liquid crystal is improved because the spaces which the liquid crystal takes up in the smart window are increased, and the interface between the liquid crystal and the glass beads becomes wider. Accordingly, driving voltage of the smart window becomes much lower, turbidity is improved, and light transmittance control range is increased.

Further, when the glass beads are formed as a structure where the upper and lower layers are staggered, light blocking rate in an OFF state is increased because light cannot pass between the glass beads. Thus, optical characteristics, for example the difference between light permeability in the ON and OFF states, may be improved.

The liquid crystal is a constituent, which interacts with an electric field generated by the transparent electrode and is arranged thereby, actively transmitting or scattering light, and located outside the glass beads, unlike PDLC.

The liquid crystal is arranged parallel to the outer face of the glass beads due to an anchoring effect with the glass beads in an OFF state without an applied voltage, thereby scattering light. In a voltage-applied ON state, the liquid crystal is arranged parallel to the electric field generated by the transparent electrode, and thus it gains the same refractive index with the refractive index of the glass beads, thereby transmitting light instead of scattering light.

Compared to PDLC, the smart window according to the present invention has an inverted structure wherein the glass beads have the shape of beads, and the liquid crystal fills the outside thereof. Accordingly, size, shape and arrangement of the liquid crystal become constant, and therefore, optical characteristics are improved.

The adhesive is a constituent which is spread or coated on one face of the transparent electrode and fixes the glass beads as the glass beads are adhered to the transparent electrode. The adhesive may be any appropriate adhesive, but it may additionally be a UV curing agent.

The smart window may be manufactured to have various thicknesses depending on use or purpose, but it may be manufactured to 1 to 50 μm in thickness. If the smart window has a thickness of 1 μm or less, it may be difficult to manufacture the smart window to have a homogeneous thickness. If the smart window has a thickness of 50 μm or more, it may have a problem in that driving voltage becomes 100 V or more.

Hereinafter, a method for producing the smart window using glass beads and liquid crystal according to an embodiment of the present invention will be described in detail. For convenience of description, a pair of transparent electrodes 11 will be described separately as the upper layer and the lower layer according to position illustrated in FIGS. 2A and 2B, and the glass beads are premised in that they are fixed on the lower layer of the transparent electrodes 11.

As illustrated in FIGS. 2A and 2B, the smart window of the present invention in accord with an embodiment thereof may contain glass beads 13 having a single layered structure, and as illustrated in FIG. 3, it may also contain glass beads 13 having a multiple layered structure. Accordingly, these will be described separately.

A method for manufacturing the smart window using glass beads and liquid crystal of the present invention illustrated in FIGS. 2A and 2B may comprise: (i) coating an adhesive 17 on one side of the lower layer of transparent electrodes 11; (ii) evenly dispersing glass beads 13 on the adhesive-coated side of the lower layer of transparent electrodes 11; (iii) adhering the glass beads 13 to the lower layer of the transparent electrodes 11 by hardening the adhesive 17; (iv) shaking out the residual glass beads 13 except the single-layered glass beads 13 adhered to the surface of the lower layer of the transparent electrodes 11 from the lower layer of the transparent electrodes 11; (v) bonding the upper layer of the transparent electrodes 11 to cause the glass beads 13 to be interposed between a pair of the transparent electrodes 11; and (vi) injecting liquid crystal 15 between a pair of the transparent electrodes 11 to the glass beads 13, so as to surround the outside of the glass beads 13.

The step (i) is spreading or coating a UV curing agent as an adhesive on the transparent electrode, and preferably, a method of spin coating at 500 to 6000 RPM may be used.

In the step (ii), a method of sprinkling the glass beads from above of the adhesive-coated side for dispersion may be used.

The step of (iii) is hardening the UV curing agent by irradiating UV for 1 to 60 sec. Through this, the glass beads may be fixed on the transparent electrode.

The step of (iv) is shaking out the residual glass beads, which are not fixed by the adhesive by applying weak external force to the transparent electrode. Through this, only a single layered glass beads adhered to the surface of the transparent electrode may be remained.

The step of (vi) is injecting the liquid crystal between a pair of the transparent electrodes 11 having structure, where the glass beads are sandwiched, using capillary force, via the step (v). The liquid crystal may be nematic liquid crystal.

A method for manufacturing the smart window using glass beads and liquid crystal of an embodiment of the present invention illustrated in FIG. 3 may comprise: (i) coating an adhesive 17 each one side of the lower layer and the upper layer of transparent electrodes 11; (ii) evenly dispersing glass beads on the adhesive-coated sides of the lower layer and the upper layer of the transparent electrodes 11; (iii) adhering the glass beads to the lower layer and the upper layer of the transparent electrodes 11 by hardening the adhesive 17; (iv) shaking out the residual glass beads except the single-layered glass beads adhered to the surface of the lower layer and the upper layer of the transparent electrodes 11 from the lower layer and the upper layer of the transparent electrodes 11; (v) bonding the lower layer and the upper layer of the transparent electrodes 11 to cause the glass beads to be interposed between a pair of the transparent electrodes 11; and (vi) injecting liquid crystal 15 between a pair of the transparent electrodes 11 to the outside of the glass beads to surround the glass beads.

Thus, in order to manufacture a smart window containing glass beads having a multiple layered structure, a method of fixing the glass beads on both of the upper layer and the lower layer of the transparent electrodes is carried out, followed by bonding the transparent electrodes by facing the glass beads inward.

EXAMPLES

The following examples illustrate embodiments of the invention and are not intended to limit the same.

Example (i) Glass beads having diameter of 9 to 13 μm (Micro sphere glass beads) were washed with acetone, and then prepared were glass beads having heterogeneous diameter using a centrifuge.

(ii) A UV curing agent (NOA65) was spin coated on one side of a transparent electrode at a speed of 6000 RPM.

(iii) The prepared glass beads were sprinkled and evenly dispersed on the UV curing agent-coated side of the transparent electrode.

(iv) UV was irradiated on a sample for 15 sec to harden the UV curing agent, thereby fixing the glass beads on the transparent electrode.

(v) External force was added to the transparent electrode to shake out the unfixed glass beads, so as to manufacture a transparent electrode where single-layered glass beads were adhered.

(vi) Another pair of the transparent electrodes was bonded to the glass beads-adhered transparent electrode, and then nematic liquid crystal was injected between the glass beads using capillary force to manufacture a smart window.

Figure 4:
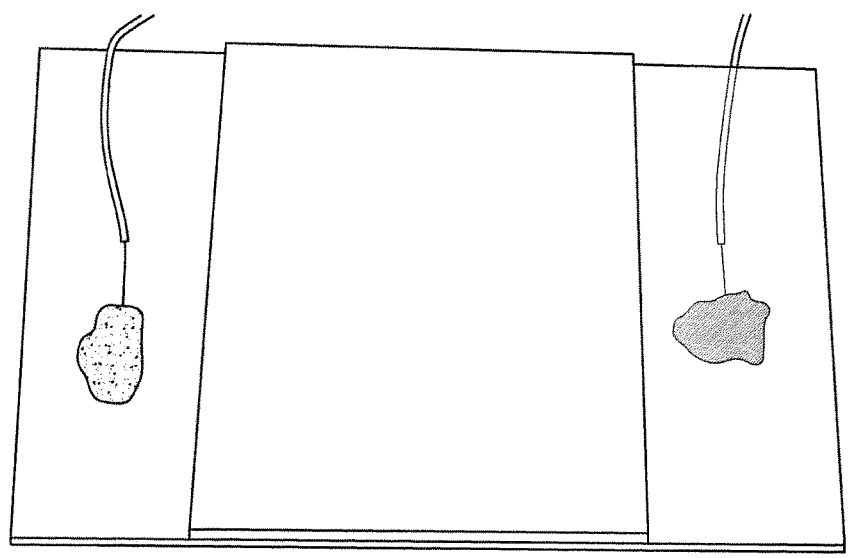
FIG. 4 is a drawing of the smart window manufactured in accord with one embodiment of the present invention.
Figure 5:
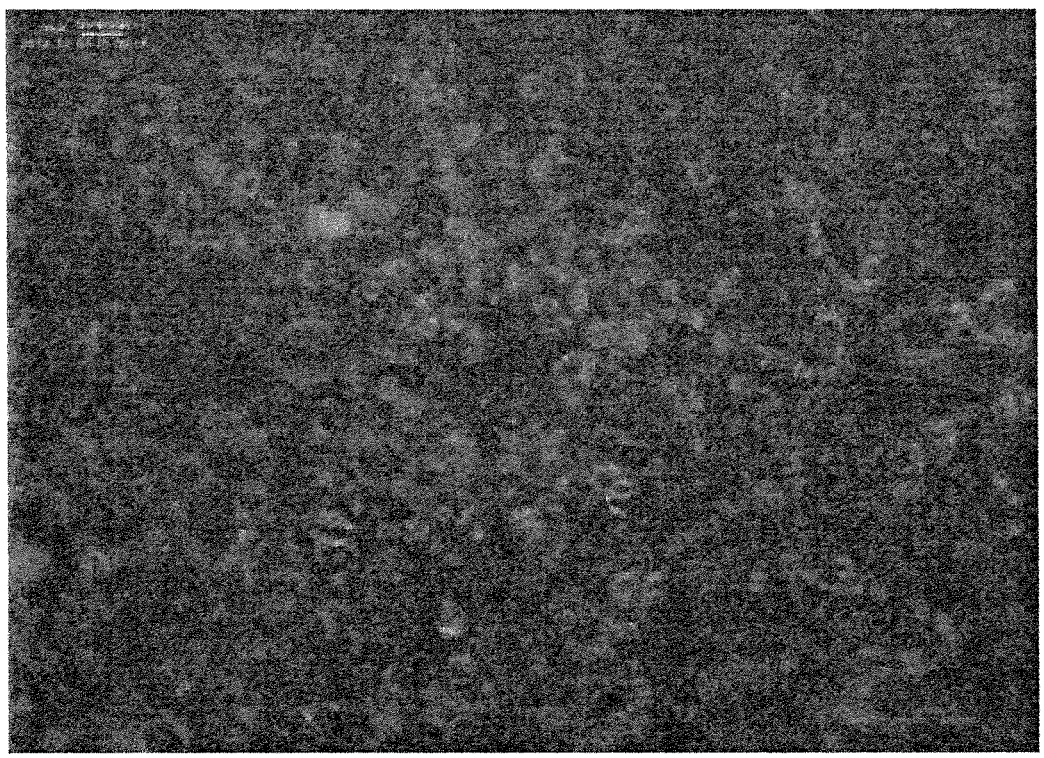
FIG. 5 is a microphotograph of the glass bead, which is evenly dispersed in the smart window manufactured in accord with one embodiment of the present invention.

FIG. 4 is a drawing of the smart window using glass beads and liquid crystal, which is manufactured in the above Example, FIG. 5 is a microphotograph of the glass bead dispersed on a transparent electrode. Referring to FIG. 5, it could be found that the glass beads are evenly dispersed on the transparent electrode.

Test Example

As described above, the smart window according to the present invention has an advantage in that optical characteristics are improved.

Figure 6:
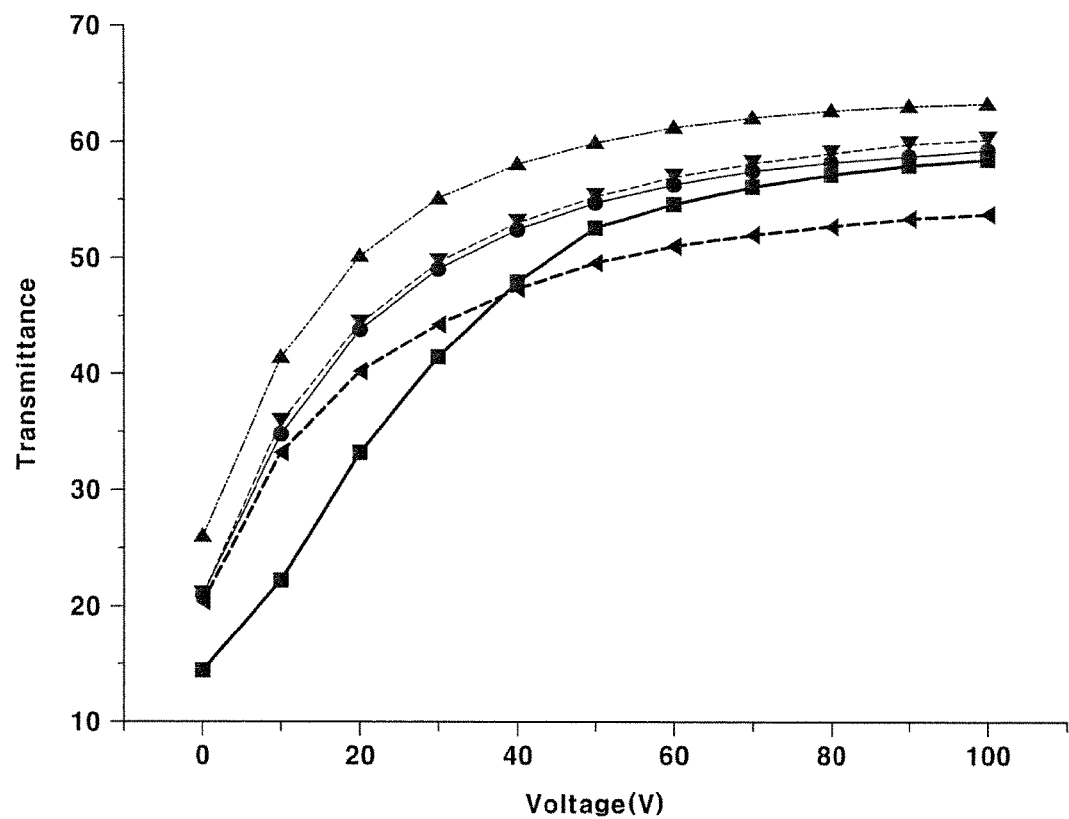
FIG. 6 is a graph measuring transmittance change according to applied voltage of the smart window manufactured in accord with one embodiment of the present invention.

FIG. 6 shows the result of measuring transmittance change according to voltage of the smart window, which was manufactured in the above Example, several times at the same condition using a transmittance measuring device (Cary 5000 UV-Vis-NIR, Agilent) after applying voltage by an alternator, which was produced on its own using a potential transformer and variable resistance.

Figure 7:
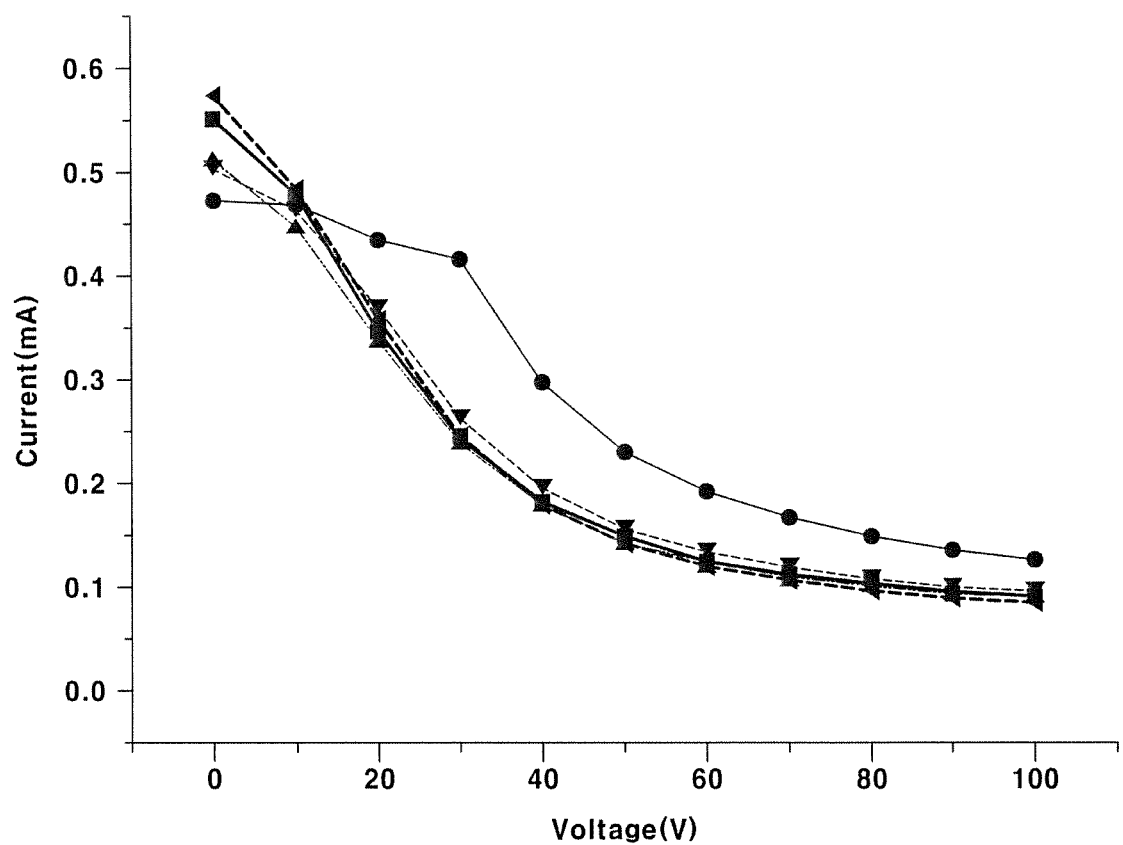
FIG. 7 is a graph measuring polarization effect of light scattered at polarizing plates, which are attached to both sides of the smart window manufactured in one embodiment of the present invention.

FIG. 7 shows the result of measuring light polarization effect of the smart window, which was manufactured in the above Example, several times at the same condition after adhering polarizing plates vertical to each other on both sides of the sample, applying voltage by an alternator, introducing light using a semiconductor laser, and then measuring the transmitted light using a photodiode.

Referring to FIG. 6, when applying a voltage of 40 V to the transparent electrode, light transmittance was increased by 40% or more, and reaction rate at this time was very fast at about a 1 ms level. Namely, the smart window according to the present invention has an advantage of having great commercial utility because it is operated by a driving voltage which is much lower than the driving voltage of the conventional PDLC of 100 V, conversion between the OFF and ON states is fast, and the difference between impermeability in the OFF and ON states is large.

Further, referring to FIG. 7, it could be found that when voltage is not applied (0 V), the incident light polarized by the polarizing plate is converted to a non-polarized state while scattered by the smart window. On the other hand, when a high voltage is applied, the polarized incident light remains in a polarized state when passing through the smart window. Accordingly, light is absorbed at the opposite polarizing plate, which is installed vertically, and therefore, is not transmitted. Thus, it may be confirmed that the smart window according to the present invention has characteristics of a smart window, which is semi-permeable in the OFF state when the polarizing plates are adhered to both sides, and becomes completely impermeable in the ON state.

The smart window using glass beads and liquid crystal in accord with embodiments of the present invention, using glass beads made from glass material, instead of polymer material, has an effect of providing a smart window which secures high stability and chemical resistance, does not have a hazing phenomenon that causes fuzziness, and has a low operating voltage.

Further, the present invention provides a smart window, which has broad range of light transmittance between the OFF and ON states because it forms an inverted structure with PDLC, and liquid crystal is constantly arranged along the outer face of the glass beads by an anchoring effect with the glass beads in the OFF state.

Further, the present invention provides a smart window, which has high light blocking rate on OFF state due to a multiple layered-structure of the glass beads, and improved operation of the liquid crystal.

Further, the present invention provides a method for producing a smart window, which is low in production cost and capable of mass production because it includes only simple processes.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a smart window comprising:
   (i) coating an adhesive on one side of a lower layer of transparent electrodes;
   (ii) evenly dispersing glass beads on the adhesive-coated side of the lower layer of transparent electrodes;
   (iii) adhering the glass beads to the lower layer of the transparent electrodes by hardening the adhesive;
   (iv) shaking out the residual glass beads except the single-layered glass beads adhered to the surface of the lower layer of the transparent electrodes from the lower layer of the transparent electrodes;
   (v) bonding the upper layer of the transparent electrodes to cause the glass beads to be interposed between a pair of the transparent electrodes; and
   (vi) injecting liquid crystal between a pair of the transparent electrodes to the glass beads, so as to surround the outside of the glass beads.

2. The method for manufacturing a smart window of claim 1, wherein the liquid crystal is injected between the transparent electrodes using capillary force.

3. A method for manufacturing a smart window comprising:
   (i) coating an adhesive on one side of each of a lower layer and an upper layer of transparent electrodes;

(ii) evenly dispersing glass beads on the adhesive-coated sides of the lower layer and the upper layer of the transparent electrodes;
(iii) adhering the glass beads to the lower layer and the upper layer of the transparent electrodes by hardening the adhesive;
(iv) shaking out the residual glass beads except the single-layered glass beads adhered to the surface of the lower layer and the upper layer of the transparent electrodes from the lower layer and the upper layer of the transparent electrodes;
(v) bonding the lower layer and the upper layer of the transparent electrodes to cause the glass beads to be interposed between a pair of the transparent electrodes; and
(vi) injecting liquid crystal between a pair of the transparent electrodes to the outside of the glass beads, so as to surround the glass beads.

4. The method for manufacturing smart window of claim 3, wherein the glass beads are a multiple layer manufactured to have a staggered structure where the glass beads adhered to the upper layer of the transparent electrodes are located at spaces between neighboring glass beads adhered to the lower layer of the transparent electrodes.

5. The method for manufacturing smart window of claim 3, wherein the liquid crystal is injected between the transparent electrodes using capillary force.

* * * * *